May 22, 1956 M. E. LANG 2,746,378
BROILERS
Filed Sept. 26, 1952
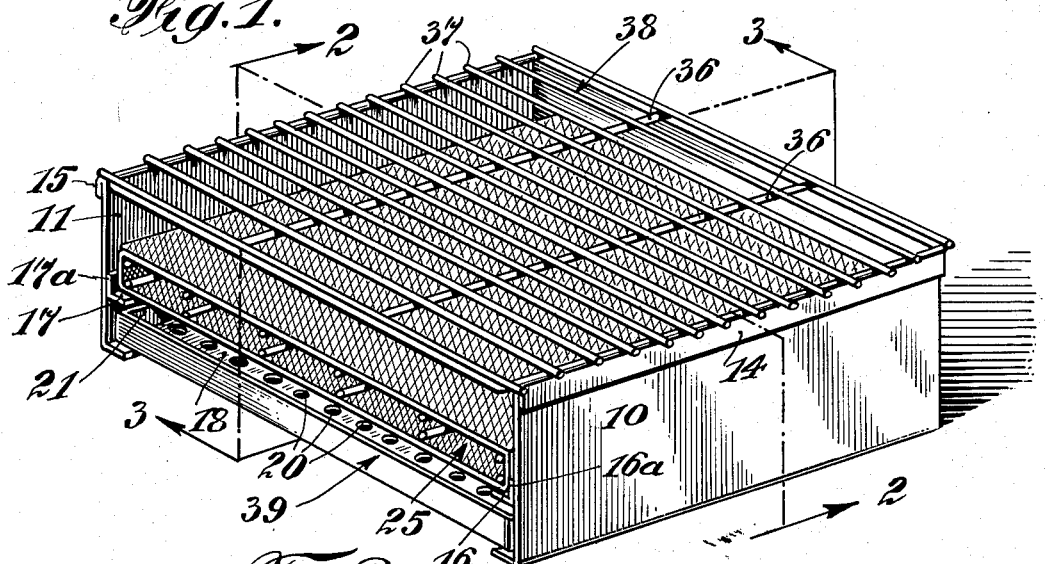
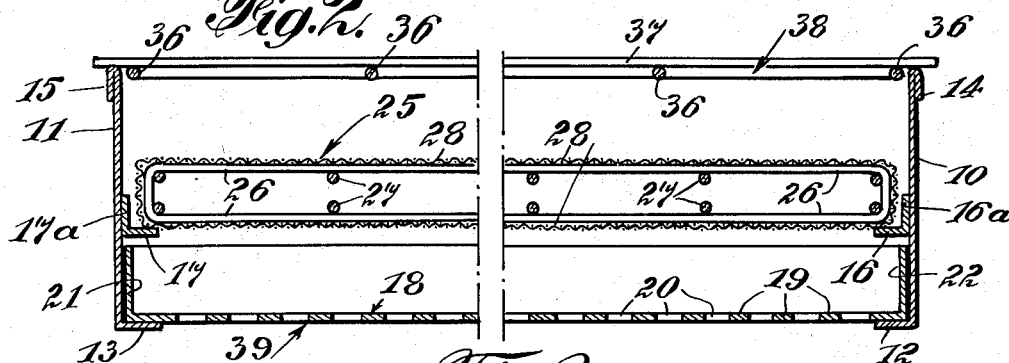
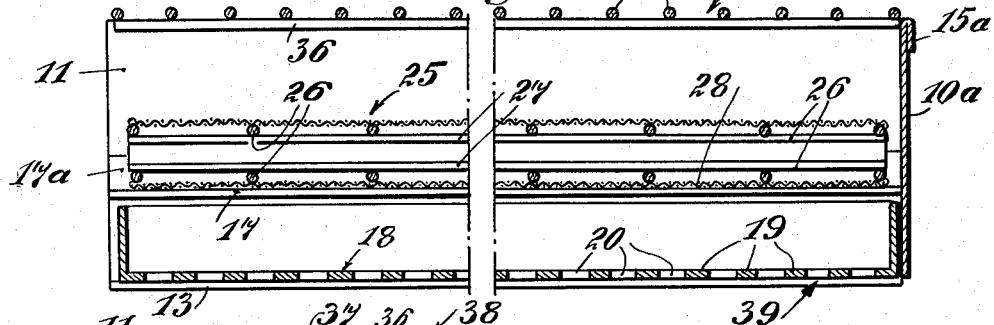
INVENTOR.
Maxwell Eichhorn Lang
BY C. P. Goepel
his ATTORNEY

United States Patent Office 2,746,378
Patented May 22, 1956

2,746,378
BROILERS

Maxwell Eichhorn Lang, New York, N. Y.

Application September 26, 1952, Serial No. 311,680

1 Claim. (Cl. 99—447)

This invention relates to broilers and more particularly to the type generally used out of doors.

The object of the invention is to provide a broiler which is easily transportable with other paraphernalia for an outdoor picnic and which, when so used, or otherwise, is safe from self-ignition. For this purpose the invention contemplates a self-contained unit having a container or housing with shelves upon which a top grid, a charcoal pan and a flame quenching unit are adapted to be placed between the pan and the grid, each being separable from and insertable into said container or housing.

The broiler of my invention consists of a container or housing having a rear wall, side walls, and a cross wall, with an open top, open front and open bottom, a grid adapted to be supported by said container, a pan containing charcoal or the like with air circulation openings, and a unit disposed between the pan and grid, said unit consisting of a skeleton supporting frame and a screen of suitable mesh to prevent a flame from passing therethrough. Preferably, said unit consists of a skeleton frame to form an interior space, covered by the screen, which screen is arranged in vertically spaced horizontal layers, so that if any fat from the grid or the object thereon being broiled, drops upon the upper layer it will pass through the meshes and if then dropped upon the lower surface will burn itself out, the flame being prevented by said mesh from passing through the upper layer. Thereby there is avoided any flame formation on the upper layer which might set the grid, and more particularly the object thereon, on fire and either create a hazard or destroy the provisions being broiled.

The invention will be further described hereinafter, an embodiment shown in the drawings, and the invention will be finally pointed out in the appended claim.

In the accompanying drawings,

Fig. 1 is a perspective view of an embodiment of the invention;

Fig. 2 is a vertical transverse section taken on line 2—2 of Fig. 1;

Fig. 3 is a vertical longitudinal section taken on line 3—3 of Fig. 1; and

Fig. 4 is a diagrammatic fragmentary section to indicate the operation of the flame action.

Similar characters of reference indicate corresponding parts throughout the drawings.

Referring to the drawings, and more particularly to Fig. 1, the improved broiler has vertical side walls 10 and 11, with an open spaced grid 38 on the top thereof, and a perforated bottom pan 39 at the lower ends of the side walls 10 and 11, and supported thereby.

Spaced above the bottom pan 39 and below the top grid 38, is a separate unit 25, which can be readily inserted or removed from the broiler.

The products to be broiled are placed on the grid 38, the charcoal 32 in the bottom pan 39 ignited, and with the unit 25 placed in position, the broiling is carried out.

The flames 33 of the charcoal 32 rise and beat against the lower side of the unit, and the heat passes therethrough, and acts upon the product being broiled. Any drop of fat or oil 35 passing through the upper layer of the unit, enters between the upper and lower layers of the unit, and if ignited, its flames 35 cannot pass through the upper layer, and are confined.

The structure of the embodiment shown consists of two side walls 10 and 11. At the inner side of each side wall, inwardly extending flanges are provided, flanges 12 and 13 for the charcoal pan 39, and flanges 16 and 17 for the unit 25. The top of the side walls 10 and 11 are bent over as shown at 14 and 15. In the embodiment shown, the flanges 12 and 13 are bent inwardly from the side walls, and the flanges 16 and 17, of angle shape, have one web 16a, 17a, welded or otherwise secured to the inner surface of the side walls.

The flanges 12 and 13 act as guide rails for the bottom pan 39 which consists of a bottom 18 with perforations 20 for the passage of air, leaving intervening bars 19, and this bottom has side walls 22, and 21, so as to act as a charcoal pan to hold the ignited charcoal. It may be readily inserted or removed.

The grid 38 consists of longitudinal bars 36 spaced apart and transverse bars 37 also spaced apart, though of a less distance. At the intersections, the bars are secured together by welding or the like. It may be a separate member convenient for cleaning and for transportation, or it may be secured to the top of the side walls.

The unit 25 consists of horizontal, but vertically spaced bars 27, surrounded by horizontal, but horizontally spaced bars 26, the latter in unending continuous flattened loop form. These are secured together at their intersecting point by welding or the like. Entirely surrounding this cake or skeleton of spaced bars, is a fine meshed screen 28 preferably of 28″ (28 strands to the inch in both directions) mesh, the sheet material used for this purpose has its ends fastened together, to form a complete coverage over the cage or skeleton. Separate top and bottom sheets could be used.

The two layers of copper mesh are separated by a space of about 1 to 2 inches. The copper mesh being a good conductor of heat dissipates the heat, and prevents heat of a high temperature from igniting gases or combustible substances on the other side of the layer. The air between the layers extinguishes any flames between the layers.

The skeleton may be constructed in a different manner, as it is purely a stiffener to hold the screens to keep the screens from sagging when heated. The screen unit may be used independently of the housing shown, as for instance in the regular oven, as a guard against the product being roasted from catching fire.

This unit 25 is seated on the guiderails 16 and 17, and may be slid into place or as readily withdrawn from the box-like container formed of the walls 10 and 11, and back wall 10a (Fig. 3).

I wish it to be understood that I do not desire to be limited to the exact details of construction shown and described, for obvious modifications will occur to a person skilled in the art.

I claim:

In a broiler, in combination: a metallic housing including three vertical walls with two of said walls parallel and spaced from each other by said third wall, a grid substantially horizontally supported by the upper edges of said walls, a pair of first guide rails extending along and attached to the lower edges of said parallel walls, a removable metallic fuel pan having a perforated top plate supported by said first guide rails within said walls substantially at the bottom of said housing, a pair of second guide rails attached to said parallel walls in substantial parallelism with and above said first guide rails, and a flame prevention unit removably supported by said second guide rails in said housing between said grid and said fuel pan, said flame prevention unit including a skeleton consisting of a plurality of first metallic bars in two parallel layers and spaced by a plurality of second metallic bars forming spaced convolutions around said first metallic bars and securely attached to said first bars at the intersections therewith, and a layer of fine mesh screen enveloping said skeleton to form a self-contained unit with a space between the two parallel layers of said screen, whereby when the fuel in said fuel pan is ignited, the flames extending through said perforated top plate of said fuel pan are confined between said parallel layers of said screen surrounding said skeleton.

References Cited in the file of this patent

UNITED STATES PATENTS

| | | |
|---|---|---|
| 199,822 | Geyser | Jan. 29, 1878 |
| 567,108 | Meier | Sept. 1, 1896 |
| 1,057,449 | Noreck | Apr. 1, 1913 |
| 1,504,102 | Davis | Aug. 5, 1924 |
| 1,959,198 | Conry | May 15, 1934 |
| 2,515,035 | Fernly | July 11, 1950 |

FOREIGN PATENTS

| | | |
|---|---|---|
| 364,820 | Great Britain | Jan. 14, 1932 |
| 399,054 | Great Britain | Sept. 28, 1933 |